United States Patent
Milner

(10) Patent No.: US 6,278,970 B1
(45) Date of Patent: Aug. 21, 2001

(54) SPEECH TRANSFORMATION USING LOG ENERGY AND ORTHOGONAL MATRIX

(75) Inventor: Benjamin P Milner, Norwich (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/043,060

(22) PCT Filed: Mar. 25, 1997

(86) PCT No.: PCT/GB97/00837

§ 371 Date: Mar. 11, 1998

§ 102(e) Date: Mar. 11, 1998

(87) PCT Pub. No.: WO97/37346

PCT Pub. Date: Oct. 9, 1997

(30) Foreign Application Priority Data

Mar. 29, 1996 (EP) .................................................. 96302236

(51) Int. Cl.$^7$ .................................................. G10L 15/02
(52) U.S. Cl. .................................................. 704/203
(58) Field of Search .................................. 704/250, 236, 704/222, 203

(56) References Cited

U.S. PATENT DOCUMENTS

| | | | |
|---|---|---|---|
| 4,092,493 | * | 5/1978 | Rabiner .................................. 704/237 |
| 5,598,504 | * | 1/1997 | Miyano .................................. 704/222 |
| 5,717,824 | * | 2/1998 | Chahhatwal .......................... 704/222 |

OTHER PUBLICATIONS

Wilpon J G, Lee C–H and Rabiner L R, Improvements in Connected Digit Recognition Using Higher Order Spectral and Energy Features, ICASSP 91 vol. 1, May 14–17, 1991, pp 349–352.*
Parsons, Thomas W., Voice and Speech Processing, McGraw Hill, pp 37–39; 176–187, Dec. 1987.*
BT Technology Journal, vol. 14, No. 1, Jan. 1, 1996, pp. 127–149, Pawleski et al, "Advances in Telephony–Based Speech Recognition".
Digital Signal Processing, vol. 2, No. 3, Jul. 1, 1992, pp. 157–173, Paliwal, "Dimensionality Reduction of the Enhanced Feature Set for the HMM–Based Speech Recognizer".
Computer Speed and Language, vol. 6, No. 2, Apr. 1, 1992, pp. 103–127, Lee et al, "Improved Acousitc Modeling for Large Vocabulary Continuous Speech Recognition".
Speech Processing 1, Toronto, May 14–17, 1991, vol. 1, May 14, 1991, Institute of Electrical and Electronics Engineers, pp. 349–352, Wilpon et al, "Improvements in Connected Digit Recognition Using Higher Order Spectral and Energy Features".
Pawlewski et al, "Advances in Telephony–Based Speech Recognition", 8438 BT Technology Journal, Jan. 14(1996) No. 1, Ipswich, Suffolk, GB., pp. 127–149.
Paliwal, "Dimensionality Reduction of the Enhanced Feature Set for the HMM–Based Speech Recognizer", 8424, Digital Signal Processing 1 (1992) Jul., No. 3, Orlando, FL, US, pp. 157–173.
Lee et al, "Improved Acoustic Modeling for Large Vocabulary Continuous Speech Recognition", 8300 Computer Speech and Language, Apr. 6 (1992), No. 2, London, GB, pp. 103–127.
Wilpon et al, "Improvements in Connected Digit Recognition Using Higher Order Spectral and Energy Features", Speech Processing 1, Toronto, May 14–17, 1991, vol. 1, May 14, 1991, Institute of Electrical and Electronics Engineers, pp. 349–352.

(List continued on next page.)

*Primary Examiner*—David D. Knepper
(74) *Attorney, Agent, or Firm*—Nixon & Vanderhye P.C

(57) ABSTRACT

Calculate the log frame energy value of each of a predetermined number n of frames of an input speech signal and apply a matrix transform to the n log frame energy values to form a temporal matrix representing the input speech signal. The matrix transform may be a discrete cosine transform.

9 Claims, 5 Drawing Sheets

OTHER PUBLICATIONS

Power, "The Listening Telephone—Automating Speech Recognition Over the PSTN", BT Technology Journal, 14, No. 1, pp. 112–126, Jan. 1996.

Hanson et al, Robust Speaker–Independent Word Recognition Using Static, Dynamic and Acceleration Features, Proc. ICASSP. pp. 857–860, 1990.

Gales et al, "An Improved Approach to HMM Decomposition", Proc. ICASSP, pp. 729–732, 1992.

Milner et al, "An Analysis of Cepstral–Time Feature Matrices for Noise and Channel Robust Speaker Recognition", Proc. Eurospeech, pp. 519–522, 1995.

Deng, "Integrated Optimization of Dynamic Feature Parameters for Hidden Markov Modelling of Speech", IEEE Signal Processing Letters, SPL–1:66–69, 1994.

Schukat–Talamazzini et al, "Optimal Linear Feature Transformations for Semi–Continuous Hidden Markov Models", Proc. ICASSP, pp. 369–372, 1995.

Euler, "Integrated Optimization of Feature Transformations for Speech Recognition", Proc. Eurospeech, vol. 1, pp. 109–112, 1995.

* cited by examiner

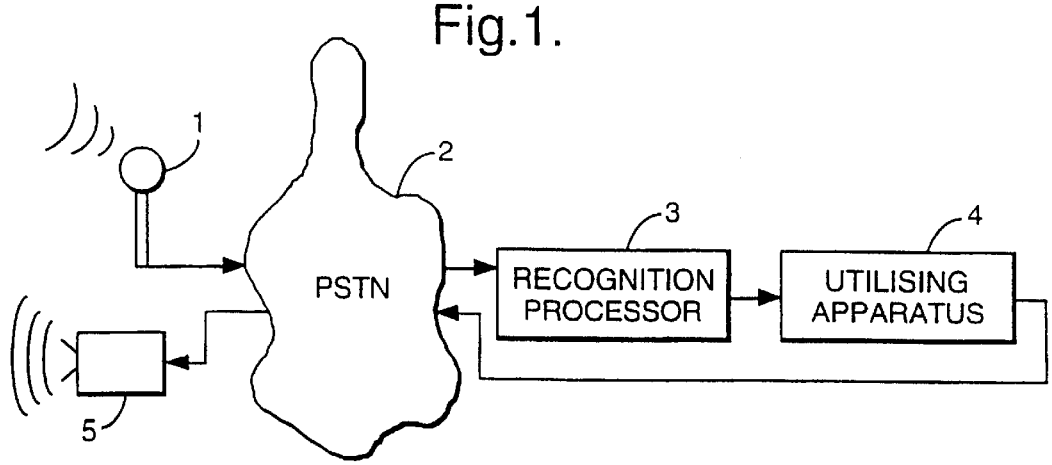
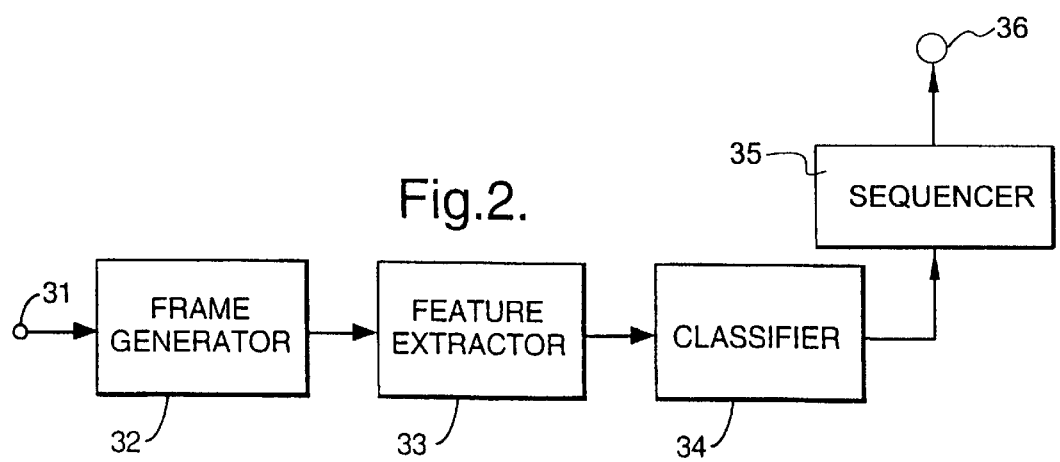

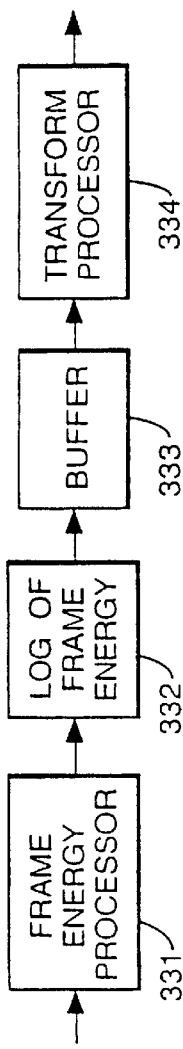
Fig.3.
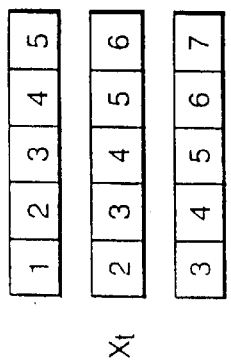
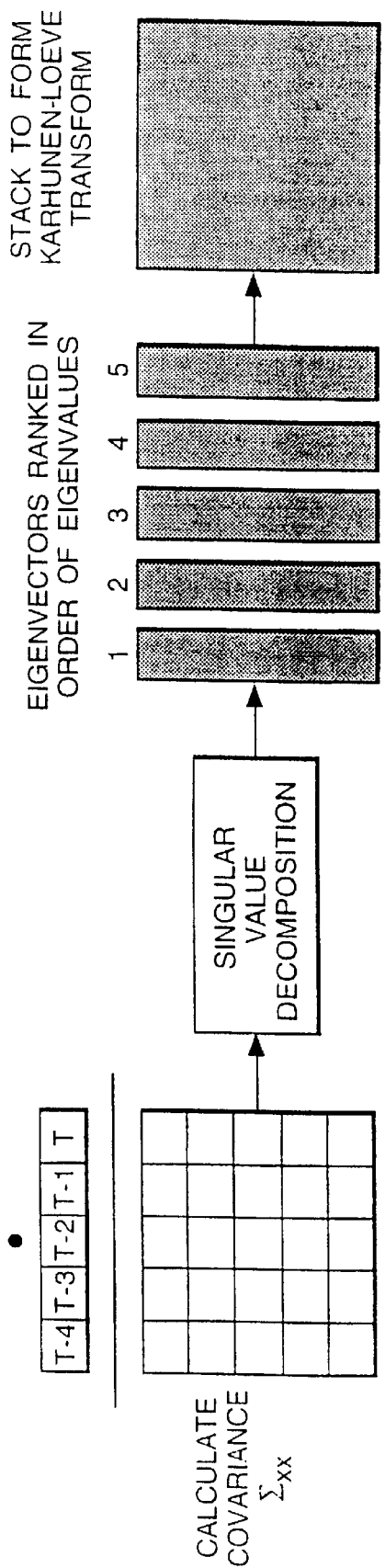
Fig.4.

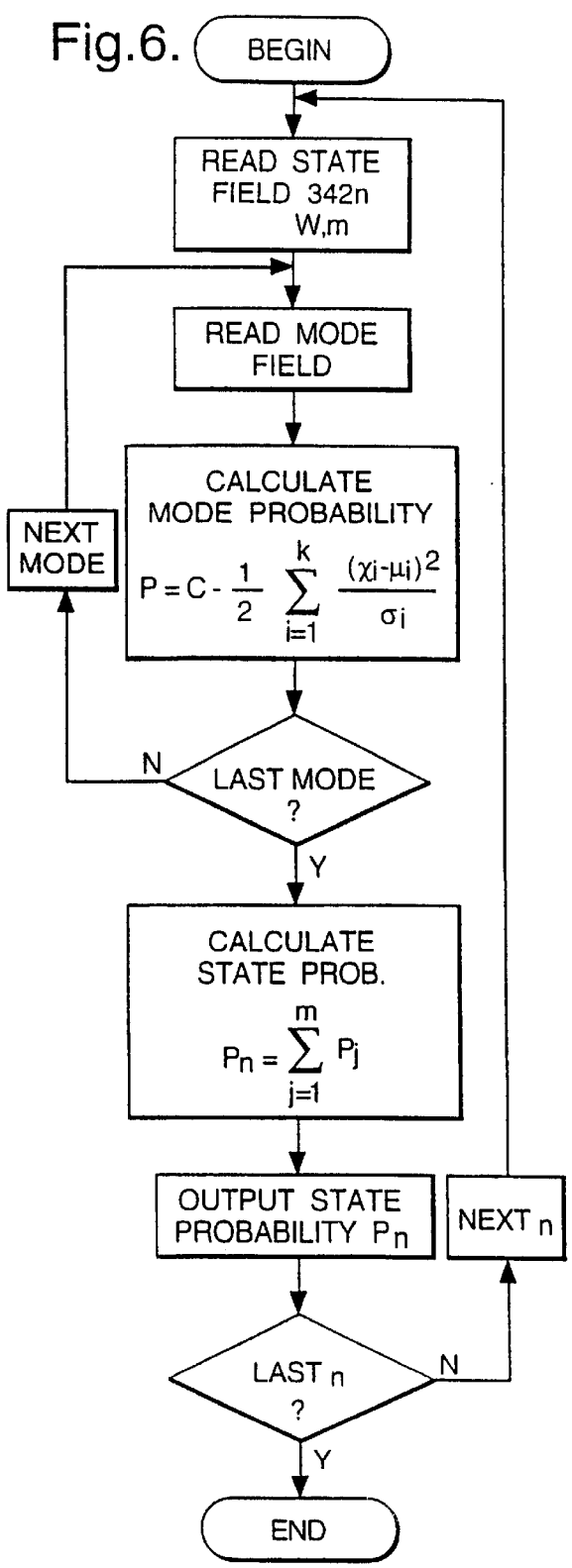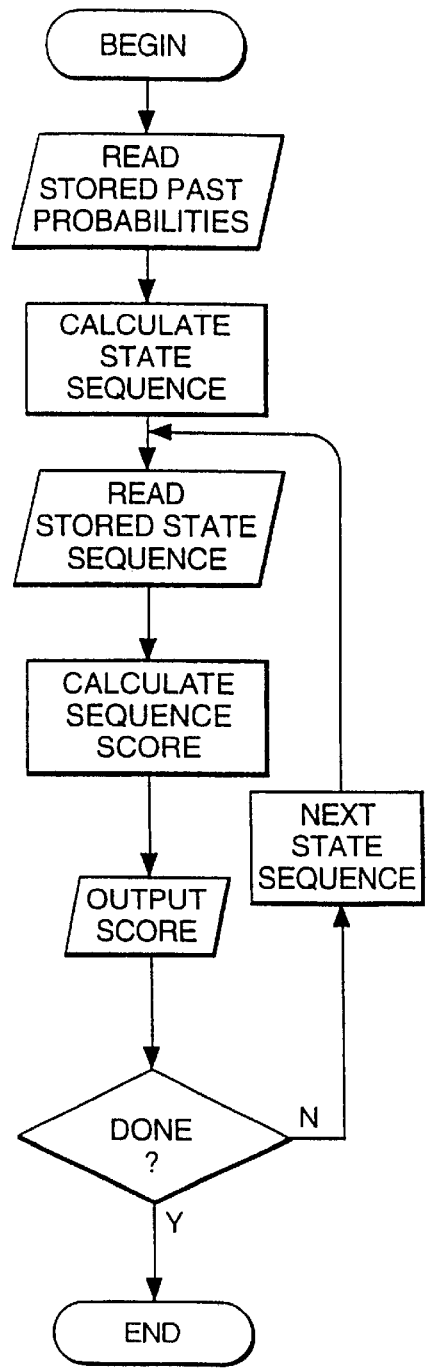

(PRIOR ART) Fig.7.
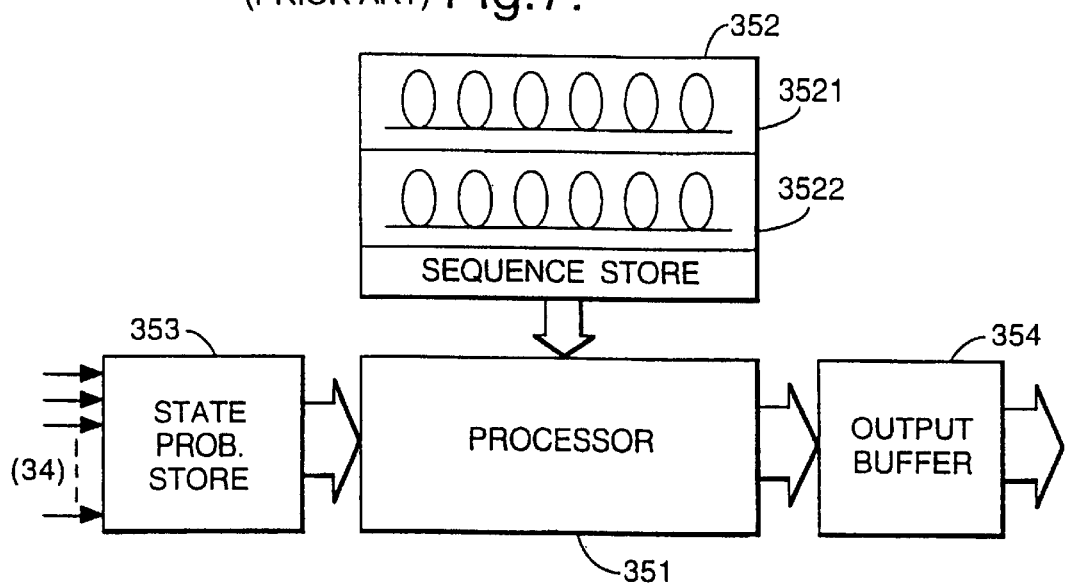
Fig.8.
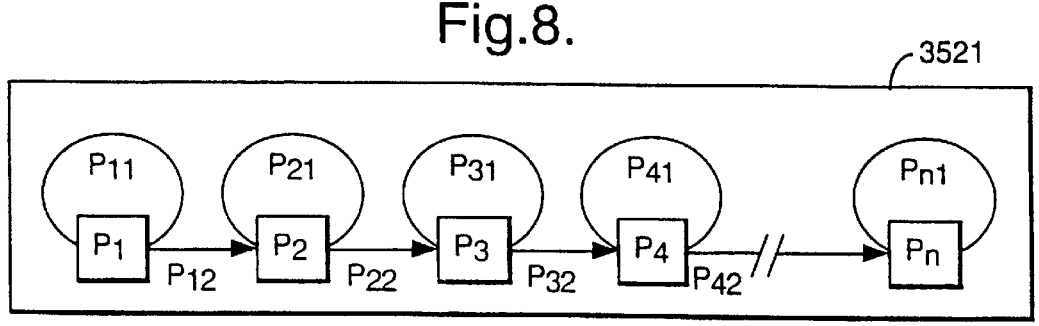

SPEECH TRANSFORMATION USING LOG ENERGY AND ORTHOGONAL MATRIX

BACKGROUND OF THE INVENTION

1. Field of the Invention

This invention relates to speech recognition and in particular the generation of features for use in speech recognition.

2. Related Art

Automated speech recognition systems are generally designed for a particular use. For example, a service that is to be accessed by the general public requires a generic speech recognition system designed to recognise speech from any user. Automated speech recognisers associated with data specific to a user are used either to recognise a user or to verify a user's claimed identity (so-called speaker recognition).

Automated speech recognition systems receive an input signal from a microphone, either directly or indirectly (e.g. via a telecommunications link). The input signal is then processed by speech processing means which typically divide the input signal into successive time segments or frames by producing an appropriate (spectral) representation of the characteristics of the time-varying input signal. Common techniques of spectral analysis are linear predictive coding (LPC) and Fourier transform. Next the spectral measurements are converted into a set or vector of features that describe the broad acoustic properties of the input signals. The most common features used in speech recognition are mel-frequency cepstral coefficients (MFCCs).

The feature vectors are then compared with a plurality of patterns representing or relating in some way to words (or parts thereof) or phrases to be recognised. The results of the comparison indicate the word/phrase deemed to have been recognised.

The pattern matching approach to speech recognition generally involves one of two techniques: template matching or statistical modelling. In the former case, a template is formed representing the spectral properties of a typical speech signal representing a word. Each template is the concatenation of spectral frames over the duration of the speech. A typical sequence of speech frames for a pattern is thus produced via an averaging procedure and an input signal is compared to these templates. One well-known and widely used statistical method of characterizing the spectral properties of the frames of a pattern is the hidden Markov model (HMM) approach. The underlying assumption of the HMM (or any other type of statistical model) is that the speech signal can be characterized as a parametric random process and that the parameters of the stochastic process can be determined in a precise, well-defined manner.

A well known deficiency of current pattern-matching techniques, especially HMMs, is the lack of an effective mechanism for the utilisation of the correlation of the feature extraction. A left-right HMM provides a temporal structure of modelling the time evolution of speech spectral characteristics from one state into the next, but within each state the observation vectors are assumed to be independent and identically distributed (IID). The IID assumption states that there is no correlation between successive speech vectors. This implies that within each state the speech vectors are associated with identical probability density functions (PDFs) which have the same mean and covariance. This further implies that the spectral-time trajectory within each state is a randomly fluctuating curve with a stationary mean. However in reality the spectral-time trajectory clearly has a definite direction as it moves from one speech event to the next.

This violation by the spectral vectors of the IID assumption contributes to a limitation in the performance of HMMs. Including some temporal information into the speech feature can lessen the effect of this assumption that speech is a stationary independent process, and can be used to improve recognition performance.

A conventional method which allows the inclusion of temporal information into the feature vector is to augment the feature vector with first and second order time derivatives of the cepstrum, and with first and second order time derivatives of a log energy parameter. Such techniques are described by J. G. Wilpon, C. H. Lee and L. R. Rabiner in "Improvements in Connected Digit Recognition Using Higher Order Spectral and Energy Features", Speech Processing 1, Toronto, May 14–17, 1991, Institute of Electrical and Electronic Engineers pages 349–352.

A mathematically more implicit representation of speech dynamics is the cepstral-time matrix which uses a cosine transform to encode the temporal information as described in B P Milner and S V Vaseghi, "An analysis of cepstral-time feature matrices for noise and channel robust speech recognition", Proc. Eurospeech, pp 519–522, 1995. The cepstral time matrix is also described by M. Pawlewski et al in "Advances in telephony based speech recognition" BT Technology Journal Vol 14, No 1.

A cepstral-time matrix, $c_t(m,n)$, is obtained either by applying a 2-D Discrete Cosine Transform (DCT) to a spectral-time matrix or by applying a 1-D DCT to a stacking of mel-frequency cepstral coefficients (MFCC) speech vectors. M N-dimensional log filter bank vectors are stacked together to form a spectral-time matrix. $X_t(f,k)$, where t indicates the time frame, f the filter bank channel and k the time vector in the matrix. The spectral-time matrix is then transformed into a cepstral-time matrix using a two dimensional DCT. Since a two-dimensional DCT can be divided into two one-dimensional DCTs, an alternative implementation of the cepstral-time matrix is to apply a 1-D DCT along the time axis of a matrix consisting of M conventional MFCC vectors.

SUMMARY OF THE INVENTION

According to a first aspect of the invention there is provided a method of generating features for use with speech responsive apparatus, said method comprising: calculating the logarithmic frame energy value of each of a predetermined number n of frames of an input speech signal; and multiplying the calculated logarithmic frame energy values considered as elements of a vector by a two dimensional transform matrix to form a temporal vector corresponding to said predetermined number of n frames of the input speech signal.

Speech transitional dynamics are produced implicitly within the temporal vector, compared to the explicit representation achieved with a cepstral vector with derivatives augmented on. Thus, models trained on such temporal vectors have the advantage that inverse transforms can be applied which allow transforms back into the linear filter bank domain for techniques such as parallel model combination (PMC), for improved noise robustness.

The transform may be a discrete cosine transform. Preferably the temporal vector is truncated so as to include fewer than n elements. This has been found to produce good performance results whilst reducing the amount of computation involved. The steady state (m=0) column of the matrix may be omitted, so removing any distortion of the speech signal by a linear convolutional channel distortion making the matrix a channel robust feature.

According to another aspect of the invention there is provided a method of speech recognition comprising:

receiving an input signal representing speech, said input signal being divided into frames;

generating a feature by calculating the logarithmic frame energy value of each of a predetermined number n frames of the input speech signal; and multiplying the calculated logarithmic frame energy values considered as elements of a vector by a two dimensional transform matrix to form a temporal vector corresponding to said predetermined number of n frames in of input speech signal;

comparing the generated feature with recognition data representing allowed utterances, said recognition data relating to the feature; and indicating recognition or otherwise on the basis of the comparison step.

In another aspect of the invention there is provided feature generating apparatus for use with speech responsive apparatus, said feature generating apparatus comprising:

a processor arranged in operation to calculate the logarithm of the energy of each of a predetermined number n of frames of an input speech signal; and multiply the calculated logarithmic frame energy values considered as elements of a vector by a two dimensional transform matrix to form a temporal vector corresponding to said predetermined number of n frames of the input speech signal.

The feature generating means of the invention is suitable for use with speech recognition apparatus and also to generate recognition data for use with such apparatus.

BRIEF DESCRIPTION OF THE DRAWINGS

The invention will now be described by way of example only by reference to the accompanying drawings in which:

FIG. 1 shows schematically the employment of a speech recogniser in a telecommunications environment;

FIG. 2 is a schematic representation of a speech recogniser;

FIG. 3 shows schematically the components of one embodiment of a feature extractor according to the invention;

FIG. 4 shows the steps for determining a Karhunen-Loeve transform;

FIG. 6 is a flow diagram showing schematically the operation of the classifier of FIG. 5;

FIG. 7 is a block diagram showing schematically the components of a conventional sequencer forming part of the speech recogniser of FIG. 2;

FIG. 8 shows schematically the content of a field within a store forming part of the sequencer of FIG. 7; and FIG. 9 is a flow diagram showing schematically the operation of the sequencer of FIG. 7.

DETAILED DESCRIPTION OF EXEMPLARY EMBODIMENTS

Figure 5:
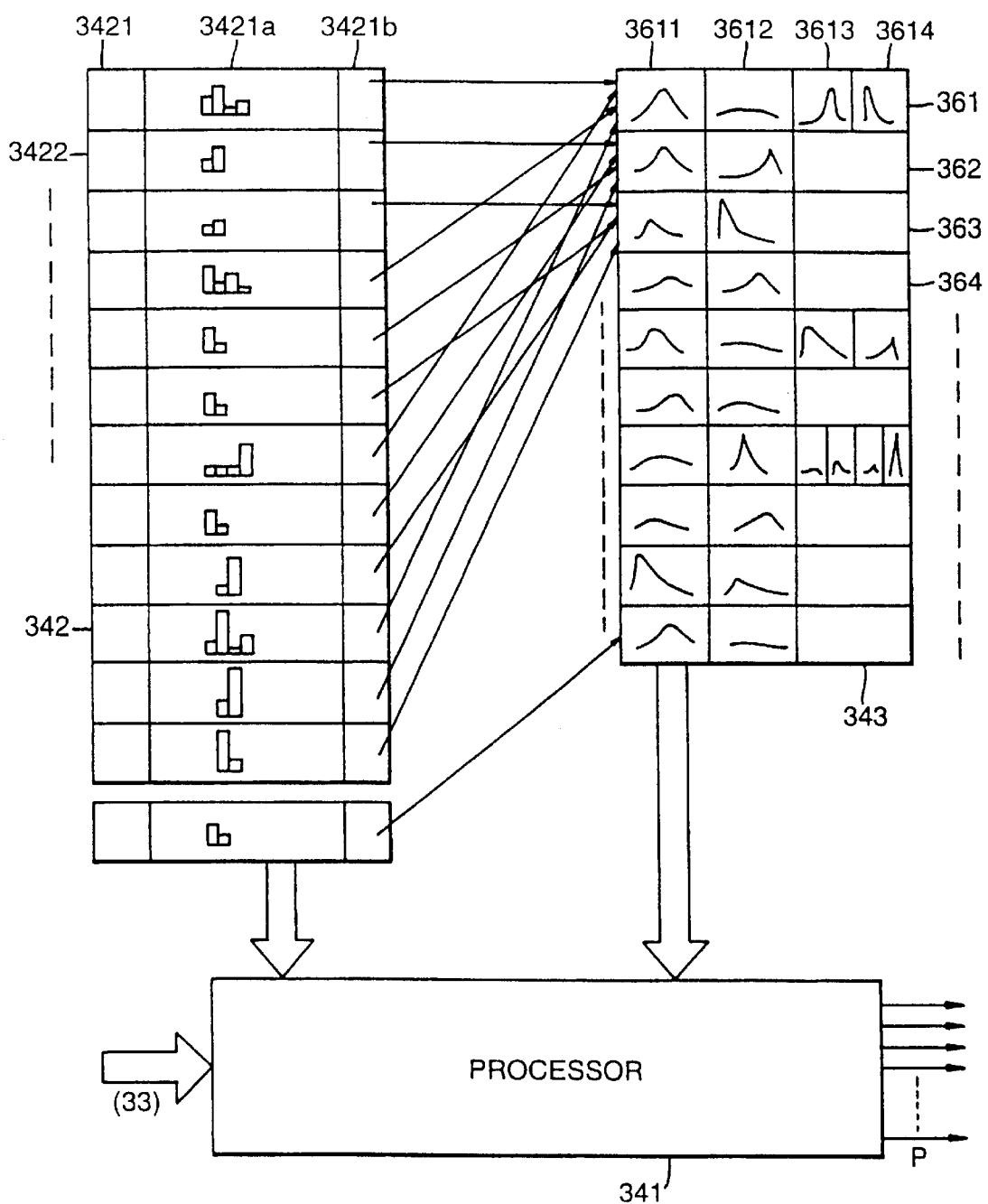
FIG. 5 shows schematically the components of a conventional speech classifier forming part of the speech recogniser of FIG. 2.

Referring to FIG. 1, a telecommunications system including speech recognition generally comprises a microphone 1 (typically forming part of a telephone handset), a telecommunications network 2 (typically a public switched telecommunications network (PSTN)), a speech recogniser 3, connected to receiver a voice signal from the network 2, and a utilising apparatus 4 connected to the speech recogniser 3 (i.e., speech recognition processor 3) and arranged to receive therefrom a voice recognition signal, indicating recognition or otherwise of a particular word or phase, and to take action of response thereto. For example, the utilising apparatus 4 may be a remotely operated terminal for effecting banking transactions, an information service etc.

In many cases, the utilising apparatus 4 will generate an audible response to the user, transmitted via the network 2 to a loudspeaker 5 typically forming part of the user's handset.

In operation, a user speaks into the microphone 1 and a signal is transmitted from the microphone 1 into the network 2 to the speech recogniser 3. The speech recogniser analyses the speech signal and a signal indicating recognition or otherwise of a particular word or phrase is generated and transmitted to the utilising apparatus 4, which then takes appropriate action in the event of recognition of the speech.

Generally the speech recogniser 3 is ignorant of the route taken by the signal from the microphone 1 to and through network 2. Any one of a large variety of types or qualities of handset may be used. Likewise, within the network 2, any one of a large variety of transmission paths may be taken, including radio links, analogue and digital paths and so on. Accordingly the speech signal Y reaching the speech recogniser 3 corresponds to the speech signal S receive at the microphone 1, convolved with the transform characteristics of the microphone 1, the link to the network 2, the channel through the network 2, and the link to the speech recogniser 3, which may be lumped and designated by a single transfer characteristic H.

Typically, the speech recogniser 3 needs to acquire data concerning the speech against which to verify the speech signal, and this data acquisition is performed by the speech recogniser 3 in the training mode of operation in which the speech recogniser 3 receives a speech signal from the microphone 1 to form the recognition data for that word or phrase. However, other methods of acquiring the speech recognition data are also possible.

Referring to FIG. 2, a speech recogniser 3 comprises an input 31 for receiving speech in digital form (either from digital network or from an analog to digital converter); a frame generator 32 for partitioning the succession of digital samples into a succession of frames of contiguous samples; a feature extractor 33 for generating a corresponding feature vector from the frames of samples; a classifier 34 for receiving the succession of feature vectors and generating recognition results; a sequencer 35 for determining the predetermined utterance to which the input signal indicates the greatest similarity; and an output port 35 at which a recognition signal is supplied indicating the speech utterance which has been recognised.

As mentioned earlier, a speech recogniser generally obtains recognition data during a training phase. During training, speech signals are input to the speech recogniser 3 and a feature is extracted by the feature extractor 33 according to the invention. This feature is stored by the speech recogniser 3 for subsequent recognition. The feature may be stored in any convenient form, for example modelled by Hidden Markov Models (HMMs), a technique well known in speech processing, as will be described below. During recognition, the feature extractor extracts a similar feature from an unknown input signal and compares the feature of the unknown signal with the feature(s) stored for each word/phrase to be recognised.

For simplicity, the operation of the speech recogniser in the recognition phase will be described below. In the training phase, the extracted feature is used to train a suitable classifier 34, as is well known in the art.

Frame Generator 32

The frame generator 32 is arranged to receive speech samples at a rate of, for example, 8,000 samples per second, and to form frames comprising 256 contiguous samples, at a frame rate of 1 frame every 16 ms. Preferably, each frame is windowed (i.e. the samples towards the edge of the frame are multiplied by predetermined weighting constants) using, for example, a Hamming window to reduce spurious artifacts generated by the frame edges. In a preferred embodiment, the frames are overlapping (for example by 50%) so as to ameliorate the effects of the windowing.

Feature Extractor 33

The feature extractor 33 receives frames from the frame generator 32 and generates, from each frame, a feature of vector of features. FIG. 3 shows an embodiment of a feature extractor according to the invention. Means may additionally be provided to generate other features, for example LPC cepstral coefficients or MFCCs.

Each frame j of an incoming speech signal is input to a processor 331 which calculates the average energy of the frame of data, i.e. the energy calculator processor 331 calculates:

$$E_{av_j} = \frac{1}{256}\sum_{i=1}^{256} x_i^2$$

where $x_i$ is the value of sample i in frame j.

A logarithmic processor 332 then forms the log of this average value for the frame j. The log energy values are input into a buffer 333 which has a length sufficient to store the log energy values for n frames e.g. n=7. Once seven frames' worth of data has been calculated the stacked data is output to a transform processor 334.

In the formation of the frame energy vector or temporal matrix the spectral-time vector of the stacked log energy values input to the transform processor 334 is multiplied by a transform matrix, i.e.

MH=T where M is the vector of stacked log energy values. H is the transform which can encode the temporal information, and T is the frame energy vector. The transform H can be retrieved from a suitable memory when needed as those in the art will appreciate.

The columns of the transform H are the basis functions for encoding the temporal information. Using the method of encoding temporal information a wide range of transforms can be used as the temporal transform matrix, H.

The transform H encodes the temporal information, i.e. the transform H causes the covariance matrix of the log energy value stack to be diagonalised. That is to say, the elements of the off-diagonal (i.e. the non-leading diagonal) of the covariance matrix of the log energy values transformed by H tend to zero. The off-diagonal of a covariance matrix indicates the degree of correlation between respective samples. The optimal transform for achieving this in the Karhunen-Loeve (KL) transform as described in the book by N S Jayant and P Noll, "Digital coding of waveforms", Prentice-Hall, 1984.

To find the optimal KL transform for encoding the temporal information conveyed by the feature vectors, statistics regarding the successive correlation of the vectors is needed. Using this correlation information, the KL transform can then be calculated. FIG. 4 shows the procedure involved in determining the KL transform from speech data.

To accurately determine the KL transform the entire set of training data is first parameterised into log energy values. Vectors $x_t$, containing n successive log energy values in time, are generated:

$$x_t = [C_t, C_{t-1}, \ldots, C_{t+n-1}]$$

From the entire set of these vectors across the training set, a covariance matrix, $\Sigma_{xx}$, is calculated $\Sigma_{xx} = E\{xx^T\} - u_x u_x^T$, where $u_x$ is the mean vector of the log energy values.

As can be seen, this is closely related to the correlation matrix, $E\{xx^T\}$, and as such contains information regarding the temporal dynamics of the speech. The KL transform is determined from the eigenvectors of the covariance matrix, and can be calculated, for example using singular value decomposition, where, $$H^T \Sigma_{xx} H = \text{dia}(\lambda_0, \lambda_1, \ldots, \lambda_M) = A$$

The resulting matrix, H, is made up from the eigenvectors of the covariance matrix. These are ranked according to the size of their respective eigenvalues, $\lambda_1$. The matrix is the KL-derived temporal transform matrix.

Other polynomials can be used to generate the temporal transform matrix, such as Legendre, Laguerre etc. The KL transform is complicated by the need to calculate the transform itself for each set of training data. Alternatively the Discrete Cosine Transform (DCT) may also be used. In this case, the transform processor 334 calculates the DCT of the stacked data relating to the log energy values for n frames.

The one-dimensional DCT is defined as:

$$F(u) = \sqrt{\frac{2}{n}} C(u) \sum_{i=0}^{n-1} f(i) \cos\left[\frac{(2i+1)u\pi}{2n}\right]$$

where
f(i)=log energy value for frame i
$C(u) = 1/\sqrt{2}$ for u=0
=1 otherwise
u is an integer from 0 to n-1

The transform processor 334 outputs n DCT coefficients generated from n frames of data. These coefficients form a frame-energy vector relating to the energy level of the input signal.

A frame energy vector is formed for each successive n frames of the input signal e.g. for frames 0 to 6, 1 to 7, 2 to 8 and so on when n=7. The frame energy vector forms part of a feature vector for a frame of speech. This feature may be used to augment other features e.g. MFCCs or differential MFCC.

Classifier 34

Referring to FIG. 5, the classifier 34 is of a conventional designing and, in this embodiment, comprises a HMM classifying processor 341, an HMM state memory 342, and a mode memory 343.

The state memory 342 comprises a state field 3421, 3422, . . . , for each of the plurality of speech parts to be recognized. For example, a state field may be provided in the state memory 342 for each phoneme of a word to be recognised. There may also be provided a state field for noise/silence.

Each state field in the state memory 342 includes a pointer field 3421b, 3422b, . . . storing a pointer address to a mode field set 361, 362, . . . in mode memory 343. Each mode field set comprises a plurality of mode fields 3611, 3612 . . . each comprising data defining a multidimensional Gaussian distribution of feature coefficient values which characterized the state in question. For example, if there are d coefficients in each feature (for instance the first 8 MFCC coefficients and the seven coefficients of the energy-matrix of the invention), the data stored in each mode field 3611, 3612 . . . characterizing each mode is: a constant C, a set of d feature mean values $\mu_i$ and a set of d feature deviations, $\sigma_i$; in other words, a total of 2d+1 numbers.

The number $N_i$ of mode fields 3611, 3612, . . . in each mode field set 361, 362, . . . is variable. The mode fields are generated during the training phase and represent the feature (s) derived by the feature extractor.

During recognition, the classification processor 34 is arranged to read each state field within the memory 342 in turn, and calculate for each, using the current input feature coefficient set output by the feature extractor 33 of the invention, the probability that the input feature set or vector corresponds to the corresponding state. To do so, as shown in FIG. 6, the processor 341 is arranged to read the pointer in the state field; to access the mode field set in the mode memory 343 to which it points; and, for each mode field j within the mode field set, to calculate a modal probability $P_j$.

Next, the processor 341 calculates the state probability by summing the modal probabilities $P_j$. Accordingly, the output of the classification processor 341 is a plurality of state probabilities P, one for each state in the state memory 342, indicating the likelihood that the input feature vector corresponds to each state.

It will be understood that FIG. 6 is merely illustrative of the operation of the classifier processor 341. In practice, the mode probabilities may each be calculated once, and temporarily stored, to be used in the calculation of all the state probabilities relating to the phoneme to the modes correspond.

The classifying processor 341 may be a suitably programmed digital signal processing (DSP) device and may in particular be the same digital signal processing device as the feature extractor 33.

Sequencer 35

Referring to FIG. 7, the sequencer 35 is conventional in design and, in this embodiment, comprises a state probability memory 353 which stores, for each frame processed, the state possibilities output by the classifier processor 341; a state sequence memory 352; a parsing processor 351; and a sequencer output buffer 354.

The state sequence memory 352 comprises a plurality of state sequence fields 3521, 3522, . . . , each corresponding to a word or phrase sequence to be recognised consisting, in this example, of a string of phonemes. Each state sequence in the state sequence memory 352 comprises, as illustrated in FIG. 8, a number of states $P_1$, $P_2$, . . . $P_N$ and, for each state, two probabilities; a repeat probability ($P_{i1}$) and a transition probability to the following state ($P_{i2}$). The observed sequence of states associated with a series of frames may therefore comprise several repetitions of each state $P_i$ in each state sequence model 3521 etc; for example.

| Frame Number | 1 | 2 | 3 | 4 | 5 | 6 | 7 | 8 | 9 | . . . Z | Z + 1 |
|---|---|---|---|---|---|---|---|---|---|---|---|
| State | P1 | P1 | P1 | P2 | P2 | P2 | P2 | P2 | P2 | . . . Pn | Pn |

As shown in FIG. 9 the sequencing processor 351 is arranged to read, at each frame, the state probabilities output by the classifier processor 341, and the previous stored state probabilities in the state probability memory 353, and to calculate the most likely path of states to date over time, and to compare this with each of the state sequences stored in the state sequence memory 352.

The calculation employs the well known Hidden Markov Model method described generally in "Hidden Markov Models for Automatic Speech Recognition: theory and applications" S. J. Cox, British Telecom Technology Journal, April 1988 p105. Conveniently, the HMM processing performed by the sequencing processor 351 uses the well known Viterbi algorithm. The sequencing processor 351 may, for example, be a microprocessor such as the Intel™ i-486™ microprocessor or the Motorola™ 68000 microprocessor, or may alternatively be a DSP device (for example, the same DSP device as is employed for any of the preceding processors).

Accordingly for each state sequence (corresponding to a word, phrase or other speech sequence to be recognised) a probability score is output by the sequencing processor 351 at each frame of input speech. For example the state sequences may comprise the names in a telephone directory. When the end of the utterance is detected, a label signal indicating the most probable state sequence is output from the sequencing processor 351 to the output port 38, to indicate that the corresponding name, word or phrase has been recognised.

What is claimed is:

1. A method of generating features for use with speech responsive apparatus, said method comprising:

calculating the logarithmic frame energy value of each of a sequence of a predetermined number n of frames of an input speech signal; and applying a predetermined orthogonal transform matrix to the n logarithmic frame every values to form a frame energy vector representing the input speech signal, wherein the predetermined orthogonal transform matrix encodes temporal information such that the elements of the off-diagonal of the covariance matrix of the frame energy vector are substantially zero.

2. A method as in claim 1 wherein successive sequences represent overlapping groups of n frames of the input signal.

3. A method as in claim 1, wherein the predetermined orthogonal transform matrix represents a discrete cosine transform.

4. A method as in claim 1, wherein the temporal matrix is truncated so as to include fewer than n elements.

5. A method of speech recognition comprising:

receiving an input signal representing speech, said input signal being divided into frames;

generating a feature by calculating the logarithmic frame energy value of each of a predetermined number n frames of the input speech signal;

applying a predetermined orthogonal transform matrix to the n logarithmic frame energy values to form a frame energy vector representing the input speech signal, the predetermined orthogonal transform matrix encoding temporal information such that the elements of the off-diagonal of the covariance matrix of the frame energy vector are substantially zero;

comparing the generated feature with recognition data representing allowed utterances, said recognition data relating to the feature; and indicating recognition or otherwise on the basis of the comparison step.

6. A method of speech recognition as in claim 5 wherein the predetermined orthogonal transform matrix represents a discrete cosine transform.

7. Feature generating apparatus for use with speech responsive apparatus, said feature generating apparatus comprising:

a processor for calculating the logarithm of the energy of each of a predetermined number n of frames of an input speech signal; and a processor for applying a predetermined orthogonal transform matrix to the n logarithmic energy values so calculated to form a frame energy vector representing the input speech signal, the predetermined orthogonal transform matrix encoding temporal information such that the elements of the off diagonal of the covariance matrix of the frame energy vector are substantially zero.

8. Feature generating apparatus as in claim 7 in which the predetermined orthogonal transform matrix represents a discrete cosine transform.

9. Speech recognition apparatus including feature generating apparatus as in claim 7.

* * * * *